United States Patent [19]

Corbett

[11] 4,175,243
[45] Nov. 20, 1979

[54] TEMPERATURE COMPENSATED OSCILLATING CRYSTAL FORCE TRANSDUCER SYSTEMS

[76] Inventor: James P. Corbett, 923 Palermo Dr., Santa Barbara, Calif. 93105

[21] Appl. No.: 852,477

[22] Filed: Nov. 17, 1977

[51] Int. Cl.² .......................................... H01L 41/10
[52] U.S. Cl. ..................... 310/338; 73/708; 73/715; 73/517 AV; 310/320; 310/328
[58] Field of Search ............ 310/312, 321, 320, 323, 310/328, 338, 355, 366, 341, 342; 331/56, 65; 73/703, 708, 715, 141 A, 517 AV, DIG. 4

[56] References Cited

U.S. PATENT DOCUMENTS

| | | | |
|---|---|---|---|
| 3,274,828 | 9/1966 | Pulvari | 310/338 X |
| 3,561,832 | 2/1971 | Karrer et al. | 310/338 |
| 3,617,923 | 11/1971 | Paradysz | 310/320 X |
| 3,879,992 | 4/1975 | Bartera | 310/312 X |
| 3,882,332 | 5/1975 | Frymoyer | 310/320 X |
| 3,891,870 | 6/1975 | Corbett | 310/338 X |
| 3,978,731 | 9/1976 | Reeder | 73/703 |
| 4,020,448 | 4/1977 | Corbett | 310/338 X |
| 4,039,969 | 8/1977 | Martin | 310/366 X |
| 4,067,241 | 1/1978 | Corbett | 310/338 X |

Primary Examiner—Mark O. Budd
Attorney, Agent, or Firm—Brumbaugh, Graves, Donohue & Raymond

[57] ABSTRACT

A fluid pessure transducer comprises a plate-like crystal. The pressure gives rise to a force which is applied by two seatings situated by opposing edges of a crystal in a direction generally along the face of the crystal. The change in oscillating frequencies of a part of the crystal provides a measure of the force and hence the fluid pressure.

In the past a second matched crystal has been employed to provide compensation for inaccuracy brought about by undesired frequency deviation due to ambient temperature change of the instrument. The present invention consists of a single crystal having on it two oscillating areas simulating the behaviour of the original pair of crystals. The single crystal facilitates manufacture of the device and improves the accuracy of the instrument.

9 Claims, 5 Drawing Figures

TEMPERATURE COMPENSATED OSCILLATING CRYSTAL FORCE TRANSDUCER SYSTEMS

This invention relates to oscillating crystal transducer systems of the types described in my U.S. Pat. Nos. 3,541,849, 3,891,870, 4,020,448 and Divisional Application also Applications 699,451/76 and 734,191/76. Further, it relates particularly to a fluid pressure transducer using a single crystal mounted within a chamber to measure the magnitude of a fluid pressure or pressure difference.

According to the present invention a fluid pressure trasnducer, which may be similar in construction to that shown in my U.S. Pat. No. 3,891,870 and reproduced again for reference in this present disclosure, comprises a single plate-like oscillating crystal which sits upright on a seating disposed on a base member which forms part of the transducer housing. Means are provided for transmitting a force to the crystal along the direction of the surface of said crystal so as to produce, in response to said force, a change of the resonant frequency of said crystal.

In the case of the present invention the force originates from a fluid pressure to be measured, this pressure being applied to a diaphragm which forms a part of the transducer enclosure.

The crystal of my U.S. Pat. No. 3,891,870 has on it a single oscillating area. The present invention resides in the use of a similar crystal having on it two separate oscillating areas. In this respect the new crystal having two areas in oscillation obviates the need for the two separate crystals of my U.S. Pat. No. 4,020,448 also it obviates the need for the re-zeroing solenoid of my U.S. Pat. No. 3,541,849. The new transducer also has the advantage over my earlier transducers that drift of the instrument output signal becomes very small or negligible because of the monolithic nature of the device whereas the output signal of the earlier device could drift due to divergence of the two separate crystal frequencies.

Reference will hereinafter be made to the accompanying drawings which illustrate various embodiments of the invention by way of example.

Figure 1:
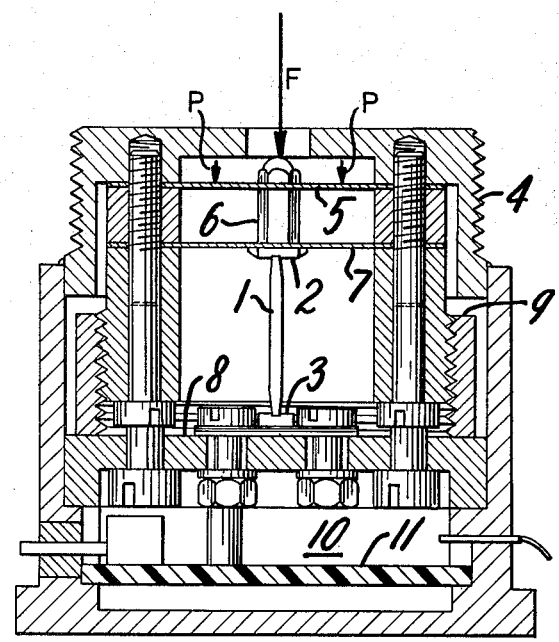
FIG. 1 shows a cross-sectional elevation view of a single crystal transducer.

Referring to FIG. 1 this shows a transducer of the general configuration illustrated in my U.S. Pat. No. 3,891,870. A crystal 1 is disposed between seats 2 and 3 which may be covered with a thin layer of soft metal such as copper. A force F which originates from a fluid pressure P on a diaphragm 5 is applied to the upper edge of crystal 1 via a spigot 6 or like member. The preset force holding crystal 1 in position is maintained by a flat spring member 7. This also secures spigot 6 so that it is only capable of transmitting force F to crystal 1 along a line parallel to the crystal face. Base 8 of the module has on it seat 3 and these two members are disposed in such a way that crystal 1 remains perpendicular to said base.

Diaphragm 5 may alternatively take the form of a flat metal spring or the combination of such a spring and diaphragm.

The preset force is applied and adjusted by rotation of ring nut 9. The base of the transducer has in it cavity 10 which is arranged to contain the electronic components which maintain crystal 1 in oscillation. These components are secured on printed circuit board 11.

In my U.S. Pat. No. 3,891,870 the crystal referred to has on it only a single oscillating area. However, the present invention, depicted in FIG. 2, involves a crystal 21 having on it two separate non-coupled portions oscillating at different frequencies under circular electrodes shown at 22 and 23. Electrode tabs 24 and 25 connect electrodes 22 and 23 to terminal points 36 and 37.

The portions of the crystal under electrodes 22 and 23 are maintained in oscillation by two separate oscillator circuits, not shown, or oscillated alternately by connection of first one and then the other electrode to a single oscillator circuit.

The two oscillatory portions under electrodes 22 and 23 may be arranged to oscillate in the thickness-shear mode and they behave analogously to the oscillating portions of the two separate crystals delineated in my U.S. Pat. No. 4,020,448. As explained in that patent the reason for the presence of the second crystal is to provide compensation for the effects of ambient temperature variations which otherwise cause undesired drifts of the instrument output signal. By employing a second oscillatory portion under electrode area 23 on the crystal 21 of the present invention, the difference frequency between the two portions of crystal 21 under electrodes 22 and 23 may be used as the instrument output signal and because both areas are on the same crystal their drift of frequency with ambient temperature change will be the same. Hence, the instrument output signal remains constant and only changes proportionally with changes in force F applied to the portion under electrode area 22 through the crystal via seatings 27 and 28 because, as will be shown, the portion of the crystal under area 23 does not change its frequency due to force F.

Figure 2:
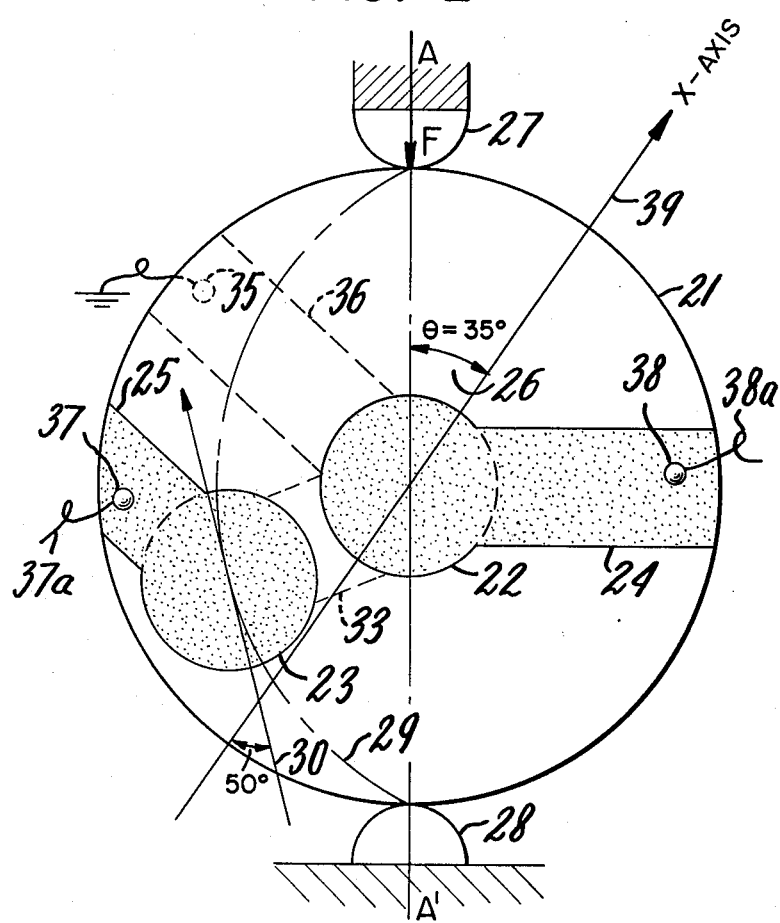
FIG. 2 shows a side elevation of a single crystal having on it two oscillating areas.
Figure 4:
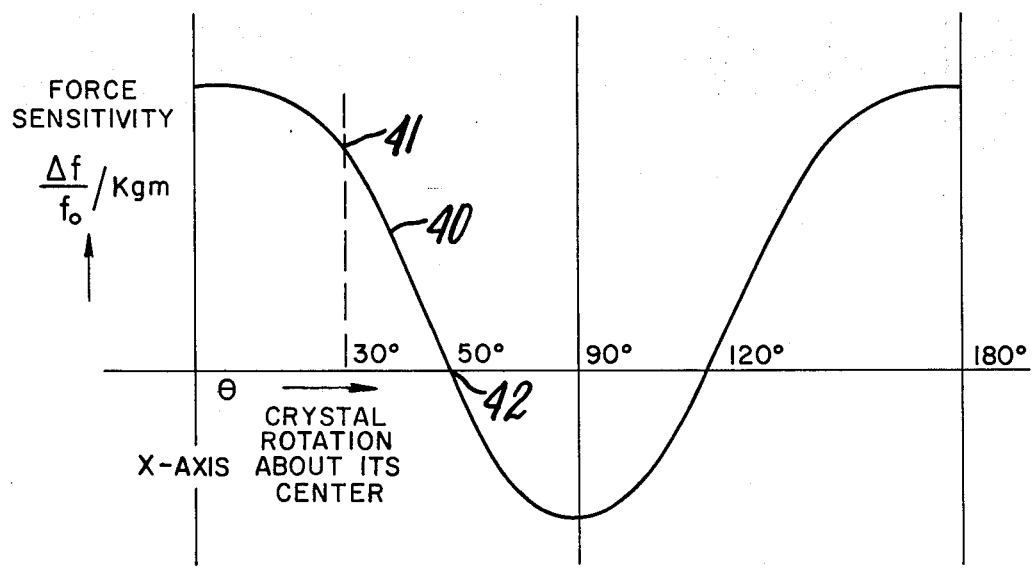
FIG. 4 shows a graph illustrating the relationship between frequency change and applied force in a crystal.

In explanation of this operation reference is now made to FIG. 4 which shows the relationship 40 of the frequency change due to force applied across a diameter of a circular crystal oscillating in thickness shear and the angle which this diameter makes with the X-axis, 39 of FIG. 2, in the material. As explained in my U.S. Pat. No. 3,891,870 it has been found that this force sensitivity has a zero temperature coefficient at an angle, $\theta$, of between 35° and 45°. This is shown at 26 in FIG. 2 with reference to the force-sensitive portion of the crystal under electrode area 22.

Electrode area 23 is placed in a position where the oscillatory frequency of the portion of the crystal under it is is insensitive to variations of force F. This insensitivity occurs because the force contour 29 originating from force F on crystal 21 of FIG. 2 takes a direction 30 at the center of electrode area 23 which direction bears an angle of 50° to the X-axis. Reference to FIG. 4 shows this zero force-frequency sensitivity at point 42 on curve 40.

Figure 3:
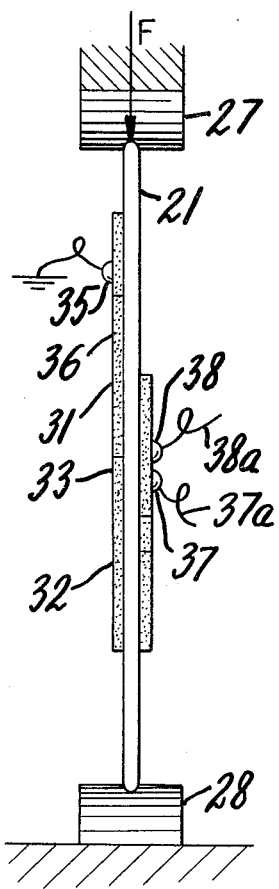
FIG. 3 shows a cross-sectional elevation of the crystal of FIG. 2.

Reference is now made to FIG. 3 which shows a cross-sectional elevation on the center-line A—A' of FIG. 2. At the rear side of crystal 21 are electrodes 31 and 32 which have the same diameters as 22 and 23. Electrodes 31 and 32 are joined by plated section 33 and coupled to grounded terminal 35 by electrode tab 36.

Electrodes 22 and 23 are connected respectively to terminals 37 and 38 whence they are connected by wires 37a and 38a to two separate oscillation maintaining circuits as heretofore mentioned.

Although crystal 21 has been shown as circular and parallel-faced it will be appreciated that the present invention could alternatively be carried into effect by a non-circular and contoured face crystal. It may be convenient to use a crystal manufactured from quartz but other materials could also be employed.

The oscillating areas under electrodes 22 and 23 have been shown at the center and between the center and periphery of crystal 2. However, employing the principles outlined, the electrodes with their corresponding oscillatory portions could be placed in alternative positions. For example, area 22 could be nearer the upper force seating 27 whereas area 23 could be to the right of the vertical center line of crystal 21.

As a further alternative it is not entirely necessary to place electrode 23 of FIG. 2 at a position where it has no frequency change when force F varies because, so long as any frequency change it may have, is different from the frequency change of area 22 then the difference frequency between the two oscillating areas may still be employed to form a measure of force F.

In a further extension of the invention, more than two electrode areas may be employed. These would be placed at various points on the crystal surface and arrange to oscillate at slightly different frequencies. In this case the difference frequencies between pairs of such electrodes may be employed to provide the instrument with more than one output signal and it may be found valuable in some applications to arrange such multiple output signals to have slightly different characteristics.

Figure 5:
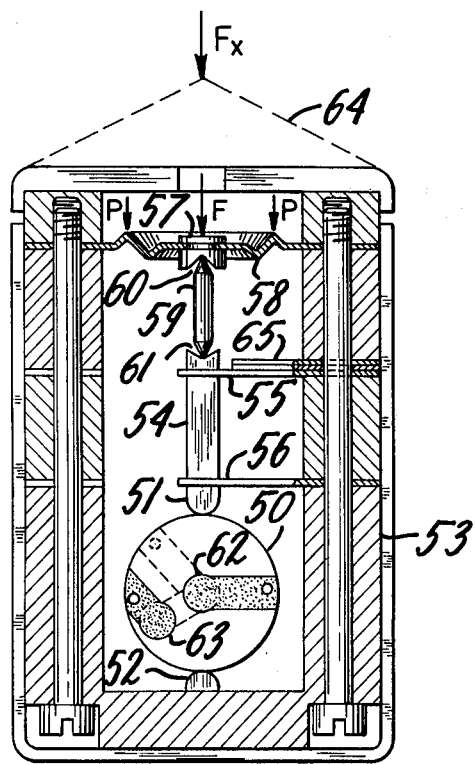
FIG. 5 shows an improved transducer containing the single crystal with two oscillating areas.

FIG. 5 shows a transducer of a preferred type incorporating the invention. A single crystal 50 is placed between two seatings 51 and 52 which are contained within a housing indicated generally at 53. Upper seating 51 is secured to a member 54 which is supported by two cantilever springs 55 and 56 so that member 54 is constrained to move and apply a force to crystal 50 only in a direction along the axis of the instrument.

Force F, which may arise from a fluid pressure P is applied to a button 57 located in the center of a serrated diaphragm 58. This force is transmitted to member 54 by means of a spindle 59 seated in conical recesses 60 and 61. The purpose of spindle 59 is to eliminate the unwanted effects which would otherwise arise from the direct application of force F to the top of member 53 because small unwanted horizontal components of force F which may be present in practical applications have been shown to cause errors in the instrument performance in the context of the very high accuracy available from this type of transducer.

The portions of the crystal 50 under electrode areas 62 and 63 are maintained in oscillation by circuits not shown and the difference frequency between the oscillatory frequencies of the oscillating areas is an accurate measure of force F or pressure P.

An alternative manner in which the transducer of FIG. 5 may be used is to measure very heavy direct loads or fluid pressures. In this case such a large force $F_x$ is shown applied to a modified domed cover 64 the extent of which is shown by the dotted line in FIG. 5.

The cover is arranged to apply the large force directly to housing 53. The compression of the housing results in increased downward spring force due to springs 55 and 56 causing the compressive force on crystal 50 to increase thereby causing the difference frequency between electrode areas 62 and 63 to increase.

Yet a further feature of the transducer of FIG. 5 is the use of a bimetallic strip 65 which adds or subtracts a small force to spring member 55. The length of the strip may be arranged to exactly compensate for any minor residual undesired frequency drifts due to ambient temperature variations.

Although the new force transducing element having two oscillating portions on a single crystal has been discussed and its operation explained with respect to two transducer configurations in the foregoing it is to be understood that it could have been employed in many of the transducers described in my patents and applications listed herein all of which employed crystals each having only a single portion in oscillation.

I claim:

1. A force transducer comprising:
   a plate-shaped piezo electric crystal having a peripheral edge,
   at least two seating members engaging the peripheral edge of the crystal and arranged to apply force directed along a line extending through the plate-like crystal from one seating member to the opposing portion of the peripheral edge,
   a first pair of electrodes disposed on corresponding regions on opposite sides of a first portion of the crystal,
   a second pair of electrodes disposed on corresponding regions on opposite sides of a second portion of the crystal spaced from the first portion, and
   means for energizing the electrode pairs to maintain oscillation of the first and second crystal portions at different frequencies,
   the seating members and the first and second crystal portions being arranged with respect to the crystal axis so that the first crystal portion is relatively insensitive to changes in ambient temperature and highly sensitive to changes in force applied by the seating members and the second crystal portion is relatively insensitive to changes in force applied by the seating members and highly sensitive to changes in ambient temperature.

2. A force transducer according to claim 1 wherein the force is directed from one of the seating members along a line bearing an angle with the X-axis of the piezo electric crystal such that the force frequency coefficient of the first oscillating member does not change with ambient temperature.

3. A force transducer according to claim 1 wherein the second crystal portion is positioned in the crystal such that its change in frequency when a force is applied by the seating members is zero.

4. A force transducer according to claim 1 wherein the difference between the frequency of oscillation of the first and second crystal portions provides an output indicative of applied force.

5. A force transducer according to claim 1 including a rod-like member engaging one of the seating members and a pair of spaced cantilever support springs arranged to restrict the force applied by the rod-like member to the direction parallel to the axis thereof.

6. A force transducer according to claim 5 including a spindle having pointed ends and wherein the rod-like member has a conical recess engaged by one end of the spindle and including a diaphragm responsive to fluid pressure and having a conical recess engaging the opposite end of the spindle.

7. A force transducer according to claim 6 including a hermetically sealed enclosure surrounding the plate-like crystal in which one portion of the enclosure is formed by the diaphragm.

8. A force transducer according to claim 7 including a domed cover for the enclosure arranged to transmit force to the seating members for the plate-like crystal through the enclosure.

9. A force transducer according to claim 5 including a bimetallic strip arranged to apply a temperature-dependent force to one of the support springs to compensate for frequency drifts in the force transducer.

* * * * *

UNITED STATES PATENT AND TRADEMARK OFFICE
CERTIFICATE OF CORRECTION

PATENT NO. : 4,175,243
DATED : November 20, 1979
INVENTOR(S) : James P. Corbett

It is certified that error appears in the above-identified patent and that said Letters Patent is hereby corrected as shown below:

Column 4, lines 39 and 42, after "portion" insert --has a frequency versus force response which--

Column 4, lines 41 and 44, before "highly" insert --has an oscillating frequency which is--

Signed and Sealed this

Eleventh Day of February 1986

[SEAL]

Attest:

DONALD J. QUIGG

Attesting Officer     Commissioner of Patents and Trademarks